United States Patent
Dubost

(10) Patent No.: US 7,578,538 B2
(45) Date of Patent: Aug. 25, 2009

(54) SYSTEM FOR ENGAGING A DASHBOARD WITH A CHASSIS OF A MOTOR VEHICLE

(75) Inventor: Dominique Dubost, La Celle Saint Cloud (FR)

(73) Assignee: Attax, Carrieres sur Seine (FR)

( * ) Notice: Subject to any disclaimer, the term of this patent is extended or adjusted under 35 U.S.C. 154(b) by 0 days.

(21) Appl. No.: 12/055,343

(22) Filed: Mar. 26, 2008

(65) Prior Publication Data
US 2008/0290684 A1   Nov. 27, 2008

(30) Foreign Application Priority Data
Mar. 26, 2007   (FR) .................................. 07 54025

(51) Int. Cl.
*B62D 25/14* (2006.01)
(52) U.S. Cl. .................................... 296/72; 296/193.02
(58) Field of Classification Search ............ 296/193.02, 296/70, 72
See application file for complete search history.

(56) References Cited

U.S. PATENT DOCUMENTS

| 5,881,798 A | 3/1999 | Luginbuehl et al. |
| 6,305,733 B1 * | 10/2001 | Rahmstorf et al. ............ 296/70 |
| 2003/0122404 A1 * | 7/2003 | Duchez ...................... 296/208 |

FOREIGN PATENT DOCUMENTS

| EP | 1586497 | 10/2005 |
| FR | 2786445 | 6/2000 |
| JP | 2002019496 | 1/2002 |
| JP | 2005186634 | 7/2005 |

* cited by examiner

*Primary Examiner*—Joseph D Pape
(74) *Attorney, Agent, or Firm*—Young & Thompson

(57) ABSTRACT

System for engaging a dashboard (P) with a chassis (C) of a motor vehicle wherein one of the components, the dashboard or the chassis, includes hook-like elements (1) which are suitable for being engaged in an opening (L) of the other component, the chassis or the dashboard, and for co-operating with members which form an engagement lock (2) and which can be moved between a retracted assembly/disassembly position for the two components and an active position for engaging the two components under the control of operating elements (3).

7 Claims, 7 Drawing Sheets

SYSTEM FOR ENGAGING A DASHBOARD WITH A CHASSIS OF A MOTOR VEHICLE

TECHNICAL FIELD

The present invention relates to a system for engaging a dashboard with a chassis of a motor vehicle.

BACKGROUND TO THE INVENTION

A dashboard of a motor vehicle generally comprises a support beam whose ends and intermediate portion comprise means for engagement with corresponding zones of the chassis of the vehicle.

Currently, the engagement means used are constituted by screw type mechanisms which are suitable for co-operating with nuts of the chassis.

However, it is found that using those screws poses a given number of disadvantages, in particular in terms of difficulties involving access thereto.

In order to bring about the fixing of the dashboard to the chassis of the vehicle, assembly operators must have access to those screws so that some elements of the dashboard must, for example, be disassembled then re-assembled once the dashboard has been fixed to the chassis.

Furthermore, such screw type systems can also pose a given number of disadvantages in particular in terms of taking up any assembly clearances.

Therefore, the problem addressed by the invention is to overcome those problems.

SUMMARY OF THE INVENTION

To that end, the invention relates to a system for engaging a dashboard with a chassis of a motor vehicle, wherein one of the components, the dashboard or the chassis, comprises hook-like means which are suitable for being engaged in an opening of the other component, the chassis or the dashboard, and for co-operating with means which form an engagement lock and which can be moved between a retracted assembly/disassembly position for the two components and an active position for engaging the two components under the control of operating means.

According to specific embodiments, the system comprises one or more of the following features, taken in isolation or in accordance with any technically possible combination:

- the means which form the lock are carried by a plate which is articulated to the corresponding component and which is connected to the operating means by a first rod, a first end of which is associated with the operating means and a second end of which is articulated to the plate in order to move it between retracted and active positions,
- the means which form the lock comprise a locking latch which can be moved in a sliding manner in a slide of the plate counter to the urging of resilient means under the action of a second handling rod which is articulated to the corresponding component and to the first rod, when the means which form the lock are moved between the retracted position and the active position thereof, in order to move past the hook-like means and to become engaged thereunder in a position for engaging the two components with each other;
- tensioning means are provided between the two components;
- the tensioning means comprise at least one tension washer which is positioned around the hook-like means;
- the operating means comprise a pneumatic jack.

BRIEF DESCRIPTION OF THE DRAWINGS

The invention will be better understood from the following description which is given purely by way of example and with reference to the appended drawings, in which.

DESCRIPTION OF PREFERRED EMBODIMENTS

Figure 1:
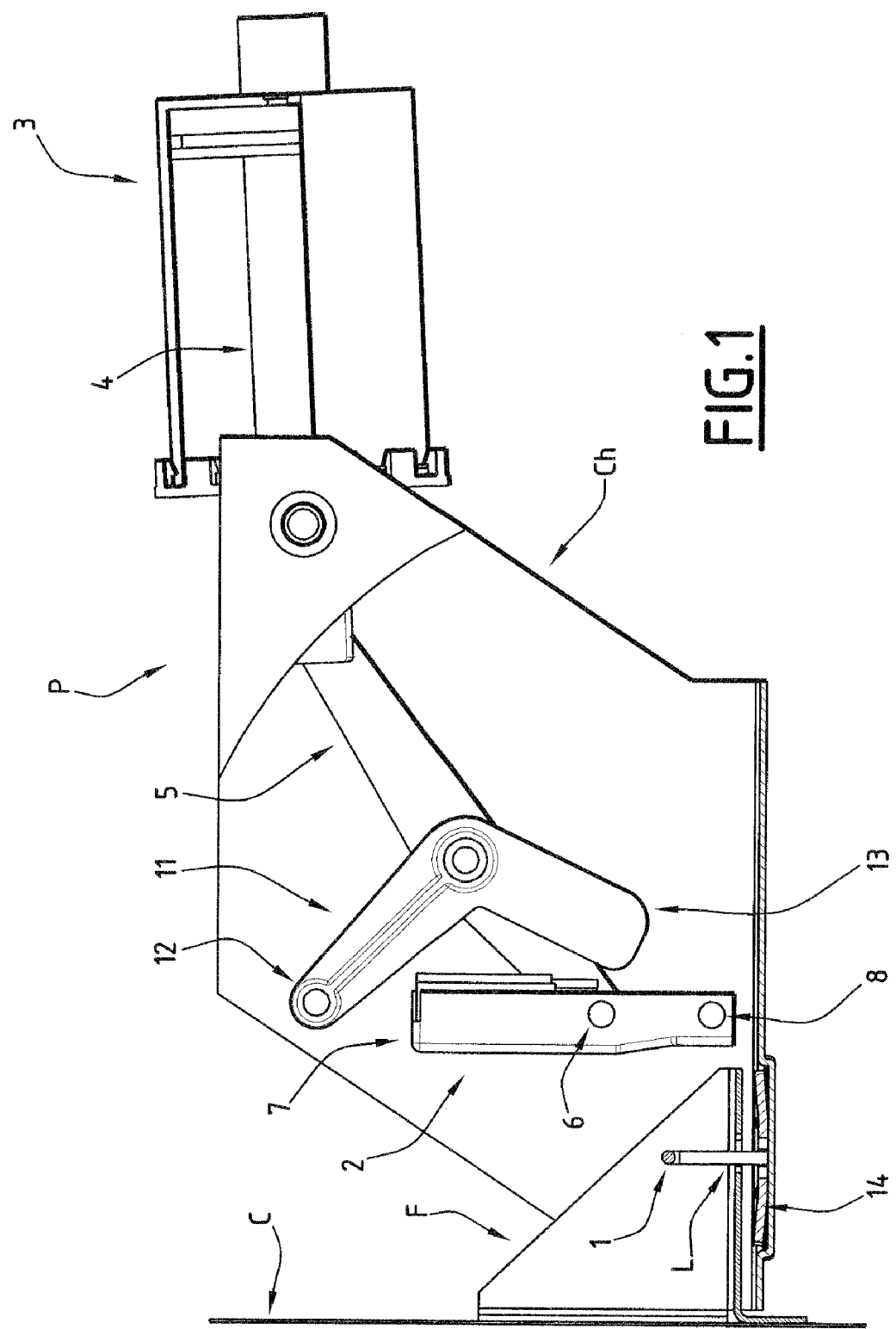
FIG. 1 is a side view of an engagement system according to the invention.
Figure 2:
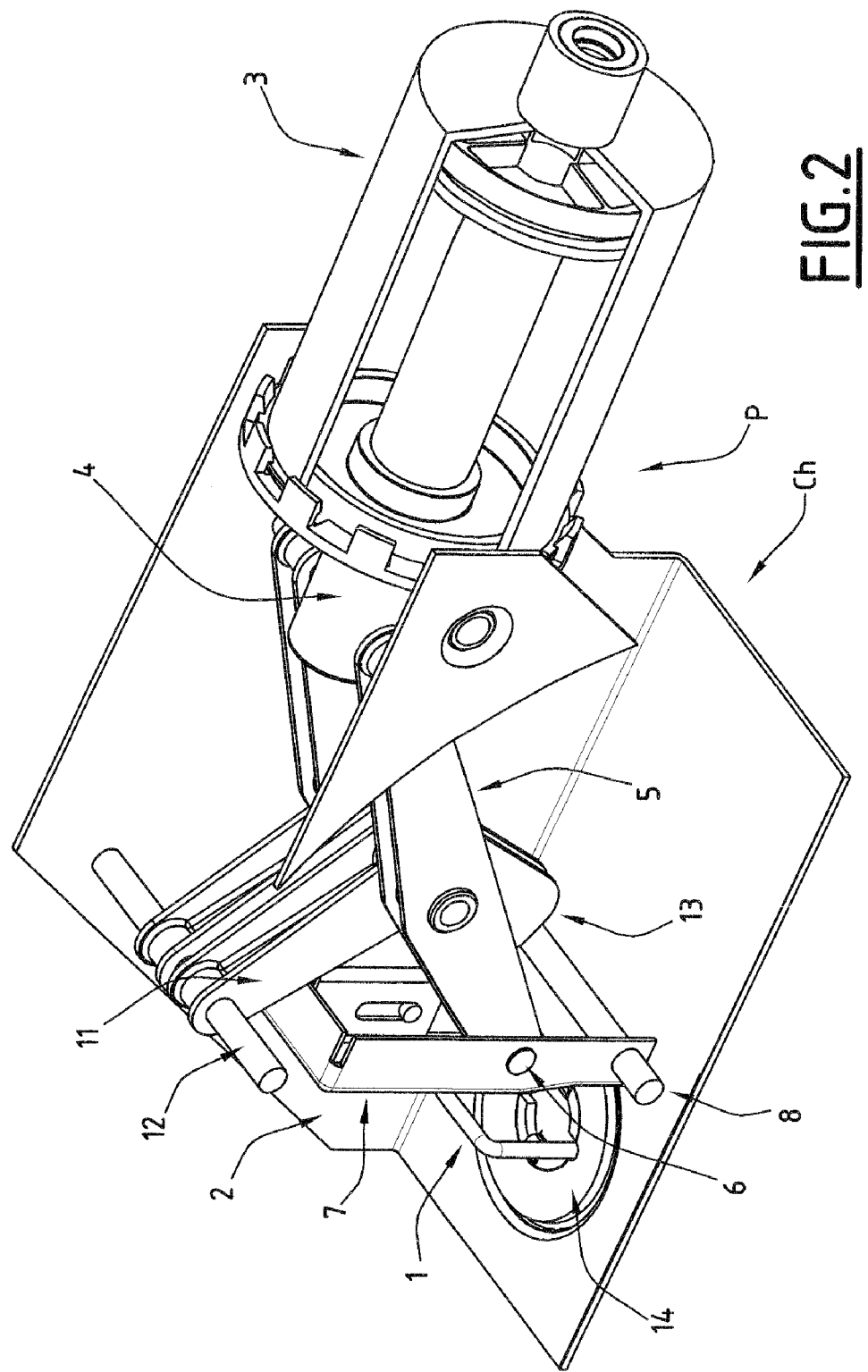
FIG. 2 is a perspective view of this system with broken-away portions.

Those Figures, and in particular FIGS. 1 and 2, illustrate a system for engaging two components with each other, one of which is formed, for example, by a beam P of a dashboard of a motor vehicle and the other is formed, for example, by a corresponding component, such as a fitting F of the chassis C of this vehicle.

One of those components, such as, for example, the beam comprises a cap Ch which is provided with the hook-like means which are generally designated 1 in this Figure.

Those hook-like means are, for example, generally U-shaped, the ends of which are fixed to the corresponding component. Those hook-like means are suitable for being engaged in an opening 1, of the other component and more particularly, for examples the fitting F thereof and for co-operating with means which form a lock and which are generally designated 2 in these Figures, and which can be moved between a retracted assembly/disassembly position for the two components, as is illustrated in FIGS. 1 and 2, and an active position for engaging the two components with each other under the control of operating means, as is illustrated in FIGS. 3 to 7.

As is illustrated in those FIGS. 1 and 2, those operating means are generally designated 3 and comprise, for example, any motorisation member such as, for example, a pneumatic jack whose power supply is controlled in order to bring about the movement of the means which form the lock towards the active position thereof.

Naturally, other embodiments of those operating means may be envisaged.

As is illustrated, those operating means have an output shank which is generally designated 4 and which is connected in an articulated manner, for example, to a first handling rod which is generally designated 5, the other end of which is articulated at 6 to a plate 7 for supporting the means which form the lock.

That plate is itself articulated at one end to the corresponding component, for example, the cap Ch, by means of an articulation rod which is generally designated 8 in this Figure.

Figure 3:
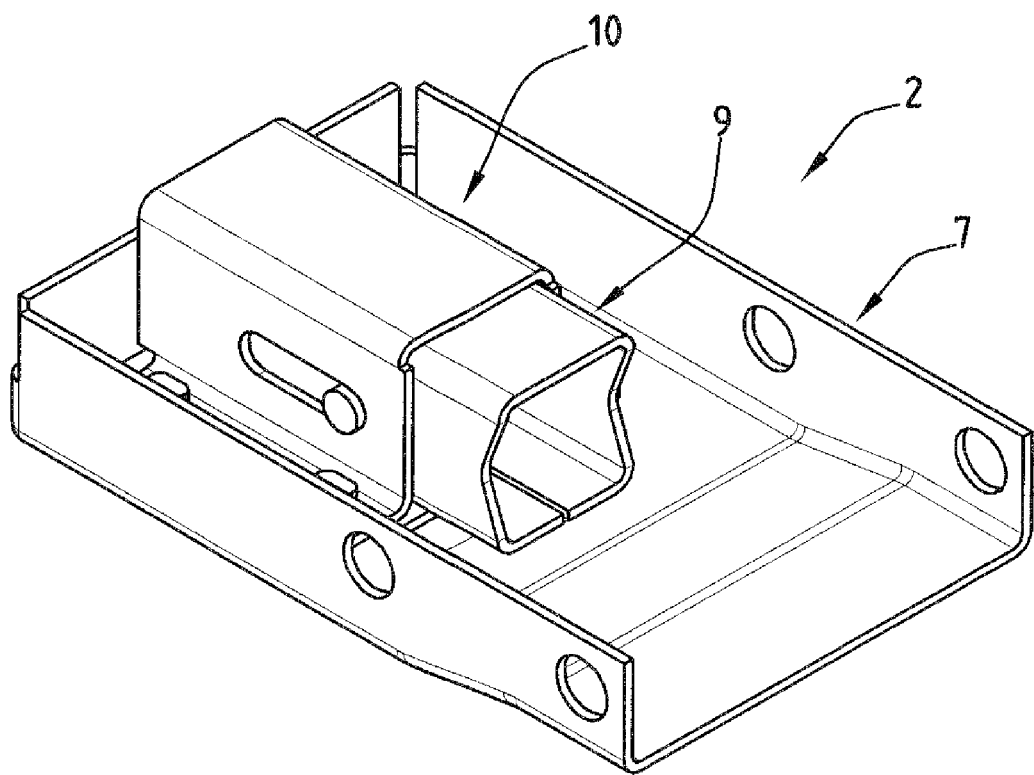
FIG. 3 is a perspective view of details of means forming the lock and being involved in the construction of such a system.
Figure 4:
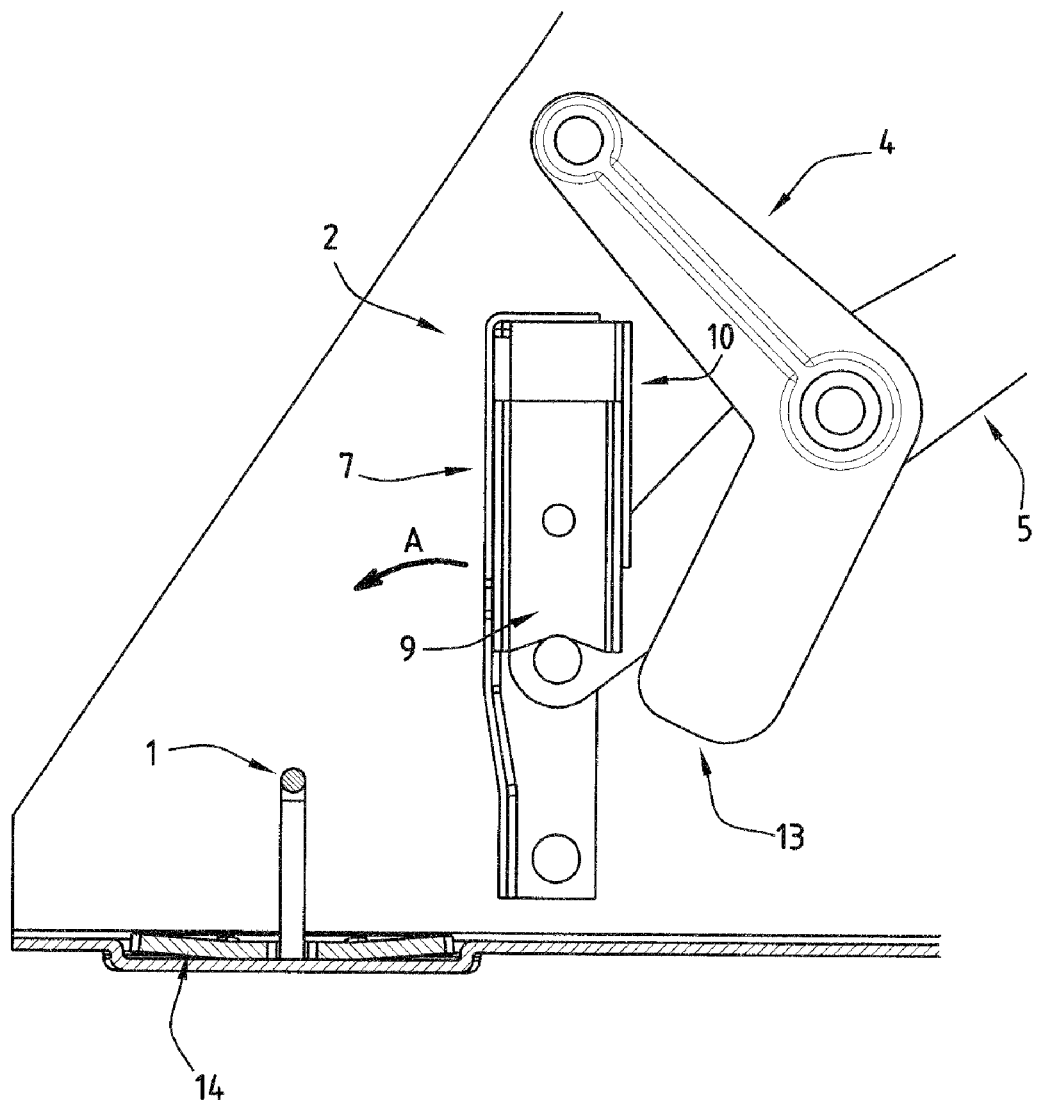
FIGS. 4, 5, 6 and 7 are detailed views illustrating the movement of the means forming the lock from their retracted assembly/disassembly position for the two components towards their active position for engagement thereof.
Figure 5:
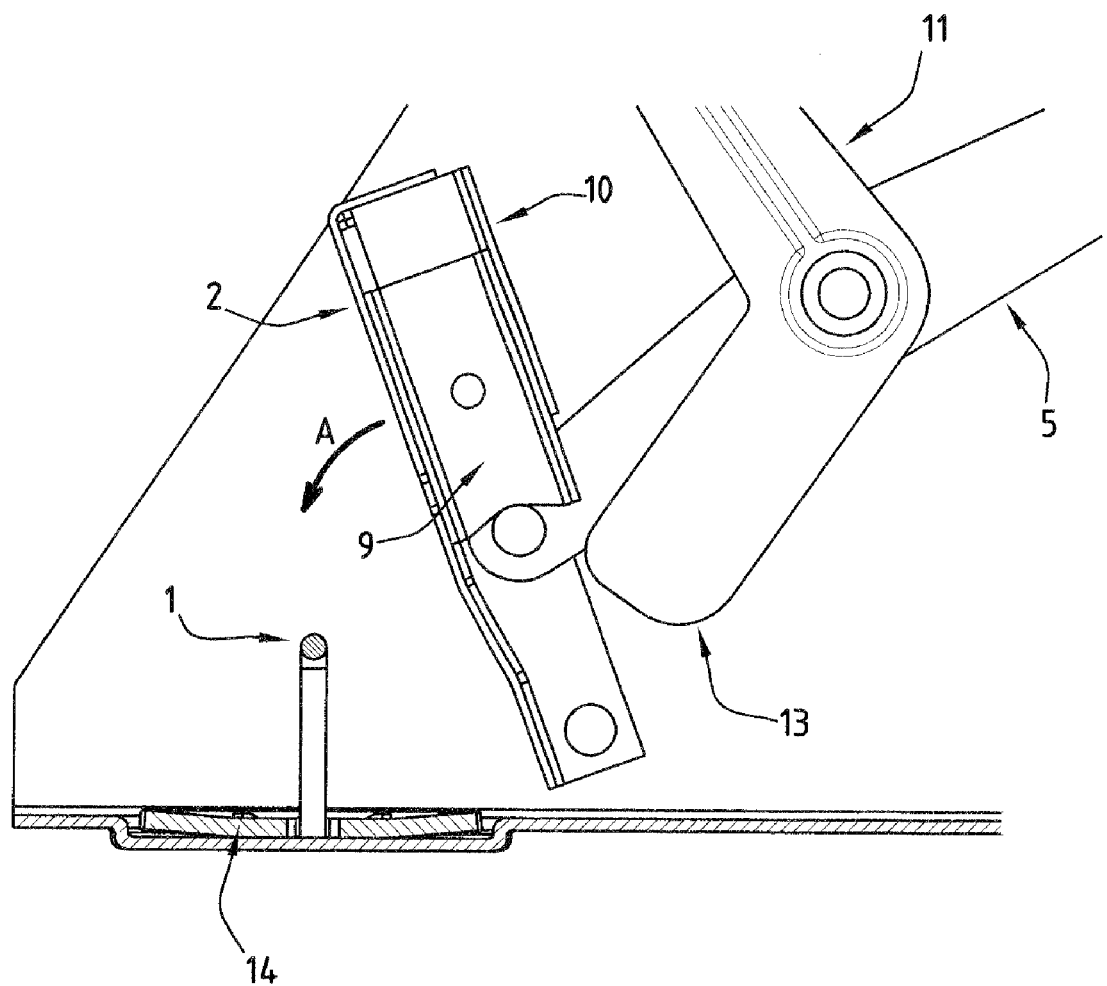
Figure 6:
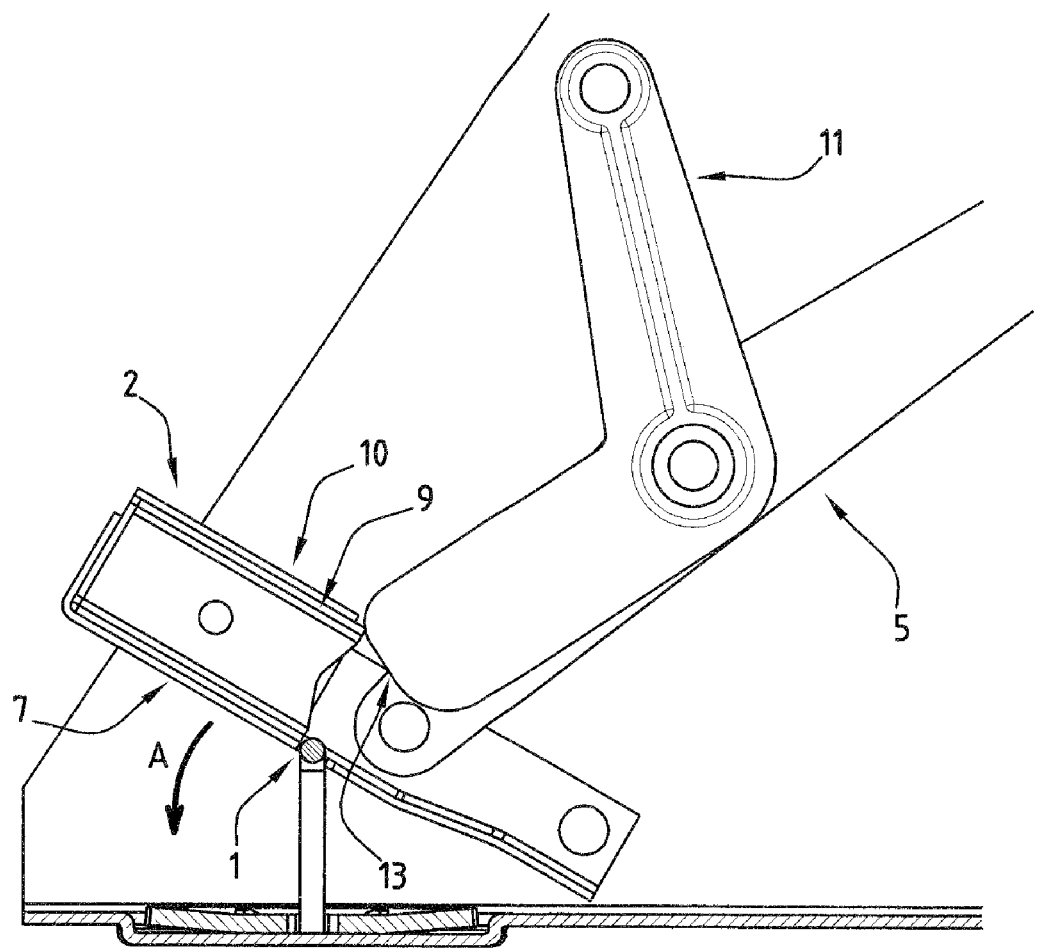

That plate for supporting the means forming the lock carries, as is illustrated in FIG. 3, a locking latch which is generally designated 9 and which is mounted so as to be slidingly movable in a slide which is generally designated 10 and which is fixed to that plate.

Resilient urging means are provided between the bottom of that slide 10 and the corresponding end of the latch 9 in order to urge the latch 9 into a withdrawn position, as is illustrated in FIG. 3.

The operation of this latch will be described in greater detail below.

It will be appreciated simply that the free end thereof is generally V-shaped.

If reference is again made to FIGS. 1 and 2, it is apparent that the first rod 5 is also articulated in the region of its intermediate portion to an intermediate portion of a second rod which is generally designated 11 and a first end of which is articulated to the corresponding component and more particularly the cap Ch, for example, by means of an articulation rod which is generally designated 12 in these Figures.

The second end (generally designated 13) of that second rod 11 constitutes, as will be described in greater detail below, means for moving and retracting the latch 9 during the movement of the means which form the lock towards the active locking position thereof.

Tensioning means are also provided between the two components.

In the embodiment illustrated, those tensioning means are formed by at least one washer which is generally designated 14 and which is arranged around the hook-like means.

Therefore, it will be appreciated that, in the specific application envisaged, for example, fixing a dashboard to a chassis of a motor vehicle, each corresponding location of the support beam of that dashboard, that is to say, its ends and its intermediate portion, may be provided with an engagement system of this type, the openings then being associated with the fittings of the corresponding chassis portions of the vehicle.

The dashboard is engaged in position in the chassis. The hook-like means are then engaged in the corresponding openings and the assembly operator can initiate the power supply for the operating means, that is to say, corresponding pneumatic jacks.

As is illustrated in FIGS. 4 to 7, the output shank 4 of the jack of each system then begins to move out, pushing the first rod 5 so as to cause the plate 7 to pivot about the axis of the articulation rod 8 thereof in the direction indicated by the arrow A in those FIGS. 4 to 7.

At the same time and owing to the specific arrangement of the articulations between the first and second rods relative to each other and relative to the cap Ch, the end 13 of the second rod 11 pushes back the latch 9 in the slide 10 of the plate 7 in order to allow it to move past the end of the hook-like means 1.

Figure 7:
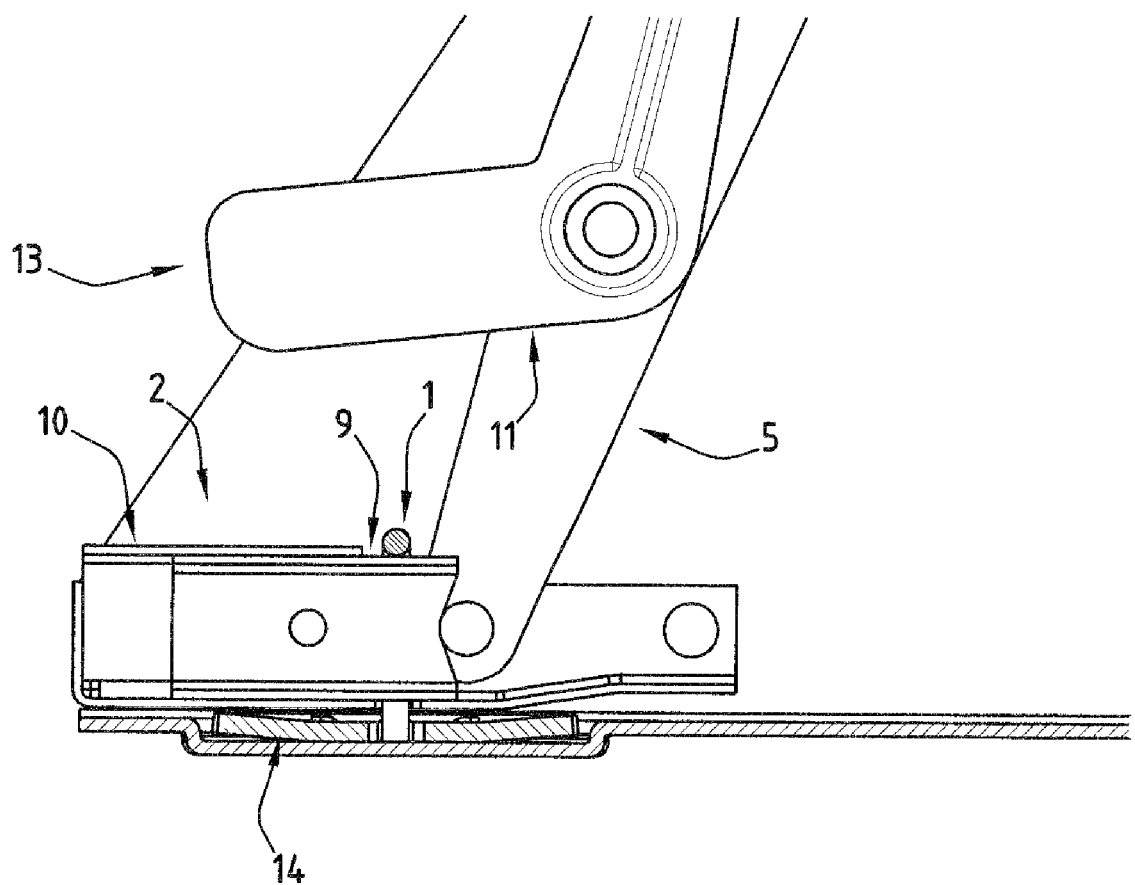

This allows, as is illustrated in FIG. 7, that latch 9 to pass under the hook-like means and then to be released from the end 13 of the second rod 11 in order to bring about the engagement of the two components with each other, engaging under those hook-like means and bringing about the biasing of the washer 14.

This allows all the assembly clearances between the two components to be taken up.

The power supply of the operating means can then be disconnected.

Thus, it will be appreciated that such a system has a given number of advantages, in particular in the specific application envisaged for fixing a dashboard to a chassis of a motor vehicle because it is no longer necessary for the assembly operator to have access to the fixing means, as was the case, for example, with the assembly screws.

Naturally, other embodiments may be envisaged.

The invention claimed is:

1. System for engaging a dashboard with a chassis of a motor vehicle, wherein one of the components, the dashboard or the chassis, comprises hook-like means which are suitable for being engaged in an opening of the other component, the chassis or the dashboard, and for co-operating with means which form an engagement lock and which can be moved between a retracted assembly/disassembly position for the two components and an active position for engaging the two components under the control of operating means.

2. Engagement system according to claim 1, wherein the means which form the lock are carried by a plate which is articulated to a corresponding component and which is connected to the operating means by a first rod, a first end of which is associated with the operating means and a second end of which is articulated to the plate in order to move it between retracted and active positions.

3. Engagement system according to claim 1, wherein the means which form the lock comprise a locking latch which can be moved in a sliding manner in a slide of the plate counter to the urging of resilient means under the action of a second handling rod which is articulated to the corresponding component and to the first rod, when the means which form the lock are moved between the retracted position and the active position thereof, in order to move past the hook-like means and to become engaged thereunder in a position for engaging the two components with each other.

4. Engagement system according to claim 2, wherein the means which form the lock comprise a locking latch which can be moved in a sliding manner in a slide of the plate counter to the urging of resilient means under the action of a second handling rod which is articulated to the corresponding component and to the first rod, when the means which form the lock are moved between the retracted position and the active position thereof, in order to move past the hook-like means and to become engaged there under in a position for engaging the two components with each other.

5. Engagement system according to claim 1, wherein tensioning means are provided between the two components.

6. Engagement system according to claim 5, wherein the tensioning means comprise at least one tension washer which is positioned around the hook-like means.

7. Engagement system according to claim 1, wherein the operating means comprise a pneumatic jack.

* * * * *